United States Patent
Suetomo et al.

(10) Patent No.: US 7,382,968 B2
(45) Date of Patent: Jun. 3, 2008

(54) RECORDING APPARATUS AND COMPUTER-READABLE PROGRAM

(75) Inventors: Tohru Suetomo, Higashihiroshima (JP); Masahiro Kawasaki, Hiroshima (JP); Youichi Yamamoto, Hiroshima (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1215 days.

(21) Appl. No.: 10/360,920

(22) Filed: Feb. 10, 2003

(65) Prior Publication Data
US 2003/0164984 A1    Sep. 4, 2003

(30) Foreign Application Priority Data
Feb. 21, 2002    (JP)    ............... 2002-044170

(51) Int. Cl.
H04N 5/91    (2006.01)
H04N 7/00    (2006.01)

(52) U.S. Cl. .......................... 386/83; 386/46
(58) Field of Classification Search .................. 386/46, 386/70, 83, 95, 125, 124
See application file for complete search history.

(56) References Cited

U.S. PATENT DOCUMENTS 5,241,395 A * 8/1993 Chen ..................... 358/426.14
2001/0014605 A1* 8/2001 Lindvall et al. ............ 455/427
2001/0030645 A1* 10/2001 Tsutsui et al. ............... 345/211
2002/0051623 A1* 5/2002 Nakatani et al. .............. 386/70
2004/0196904 A1* 10/2004 Chun .................... 375/240.03
2005/0210071 A1* 9/2005 James .................... 707/104.1
2006/0187300 A1* 8/2006 Davidson ..................... 348/77

FOREIGN PATENT DOCUMENTS

| CN | 1103529 | 6/1995 |
|---|---|---|
| JP | 63-42056 | 2/1988 |
| JP | 7-322169 | 12/1995 |
| JP | 2001-231010 | 8/2001 |
| JP | 2001-333375 | 11/2001 |
| JP | 2002-84497 | 3/2002 |

* cited by examiner

Primary Examiner—Robert Chevalier
(74) Attorney, Agent, or Firm—Wenderoth, Lind & Ponack, LLP

(57) ABSTRACT

MPEG encoder 3 generates VOBUs from broadcast waves and writes them to HDD 5. Record controlling unit 10 controls MPEG encoder 3 and HDD 5 to repeatedly perform this writing process for achieving a continuous recording function. Record controlling unit 10 also judges if there are points of time at which, by a broadcast station, (i) a service period is switched to an out-of-service period, and (ii) an out-of-service period is switched to a service period. Record controlling unit 10 suspends the writing to the HDD 5 at a point of time at which a service period is switched to an out-of service period, and resumes the writing to the HDD 5 at a point of time at which an out-of-service period is switched to a service period.

14 Claims, 18 Drawing Sheets

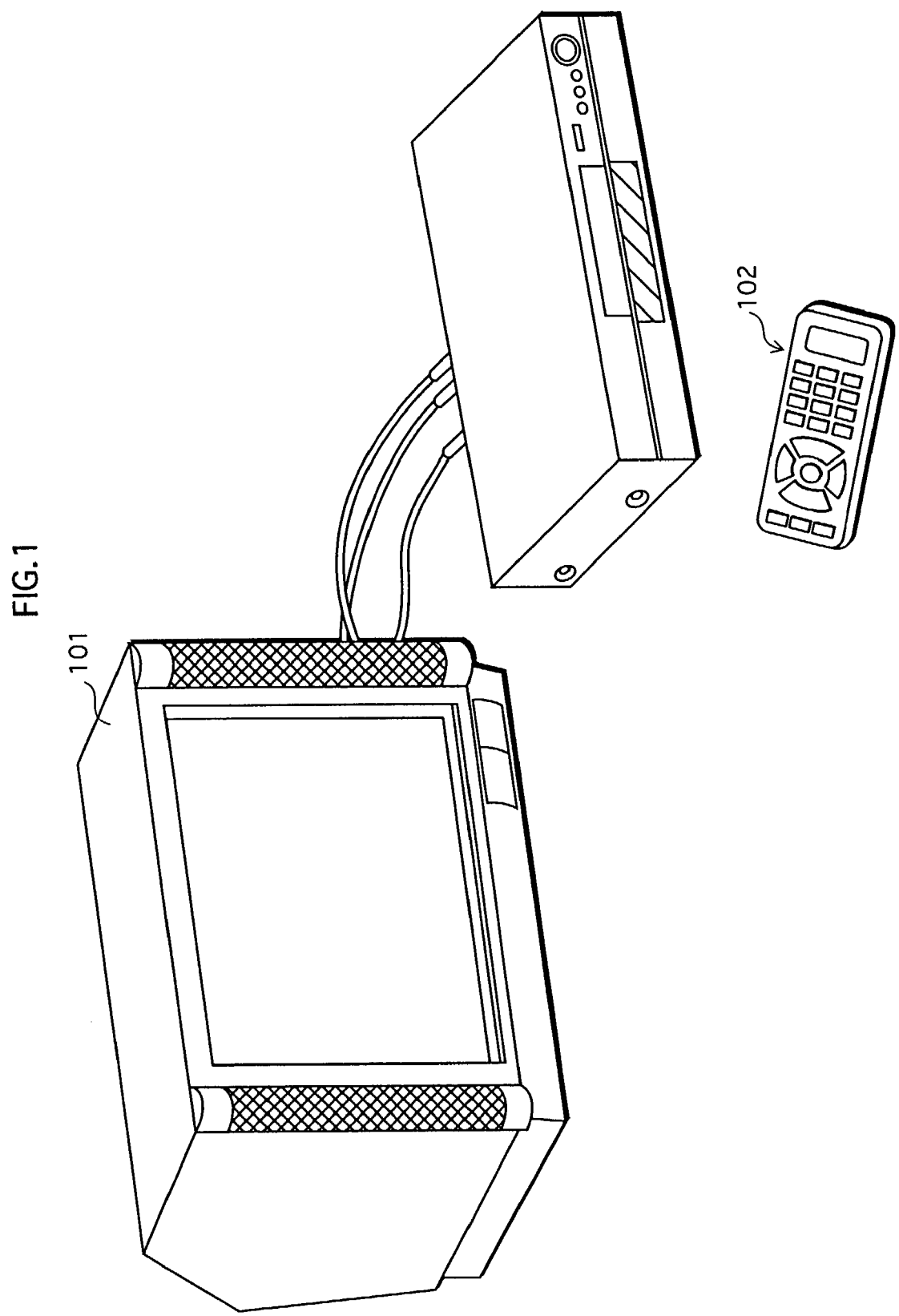

TYPES OF PICTURES DURING OUT-OF-SERVICE PERIODS

WAVELESS STATE (TV STATIC)

COLOR BARS

VIEW FROM THE BROADCAST STATION

WHEN NO PSI
(PROGRAM SPECIFIC INFORMATION)
IS PROVIDED

WRITE THE PART FOR
"END OF HD AREA - WP"
INTO AFTER WP

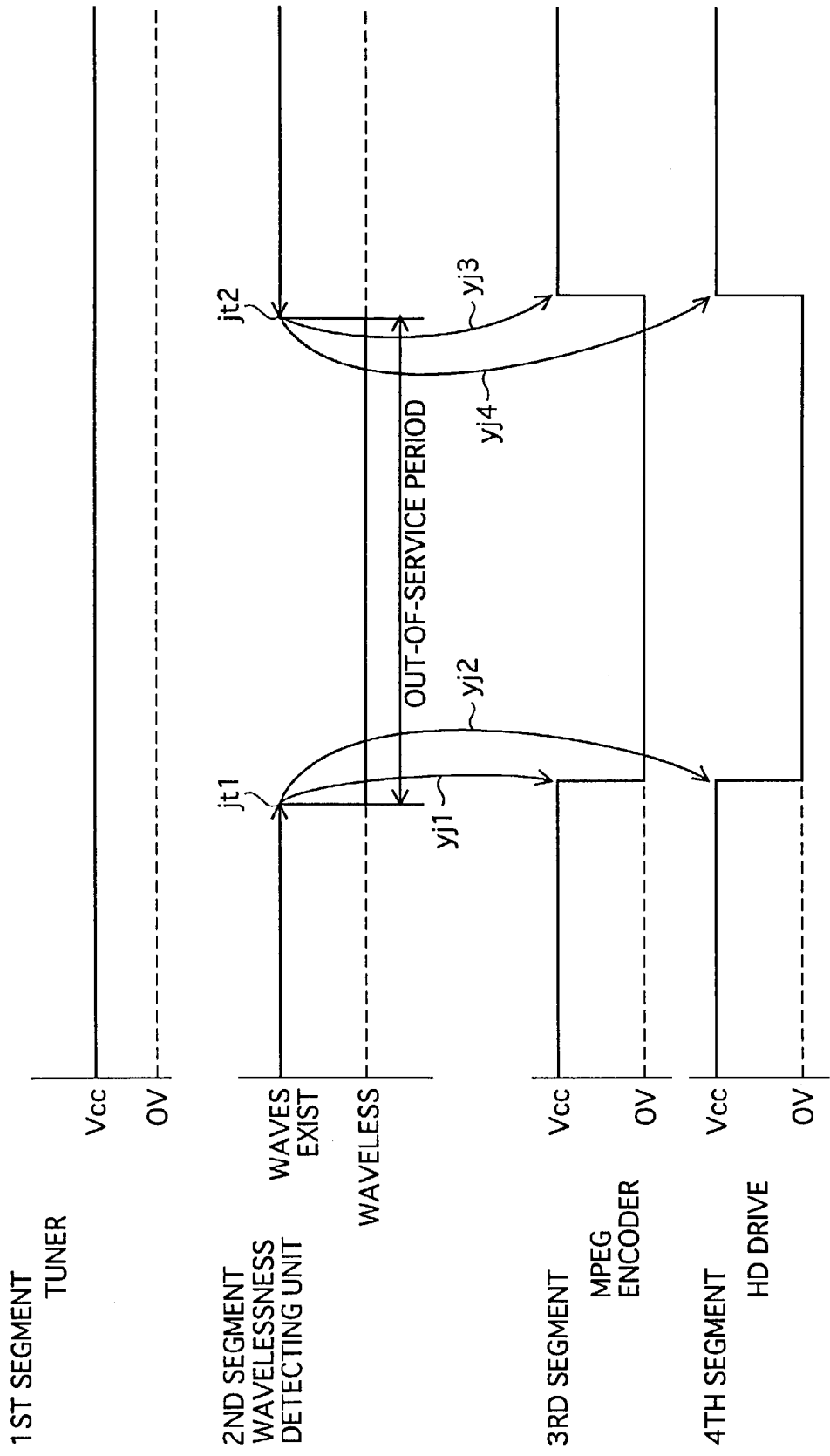

FIG.17A

PMT#1

| Video | PID= 001 |
|---|---|
| Audio | PID= 002 |

PMT#2

| Video | PID= 002 |
|---|---|
| Audio | PID= 001 |

FIG.17B

PAT

| PROGRAM 1 | PMT # 1 |
|---|---|
| PROGRAM 2 | PMT # 2 |
| ⋮ | ⋮ |
| PROGRAM n | PMT # n |

RECORDING APPARATUS AND COMPUTER-READABLE PROGRAM

BACKGROUND OF THE INVENTION

1. Field of the Invention

The present invention relates to recording apparatuses that perform recording process on broadcast programs, particularly to an improvement on continuous recording process.

2. Description of the Background Art

It has started to be considered to equip a recording apparatus capable of recording for long hours with a continuous recording function. "Continuous recording" means to endlessly keep recording broadcast contents by sequentially recording the broadcast contents on a certain channel according to a user's operation, and overwriting the recorded broadcast contents from the start of the recording medium when it gets full.

When a recording apparatus performs continuous recording on a recording medium of a HD (Hard Disk) with a capacity of 52-hour-long contents, there will be broadcast contents of up to 52 hours ago recorded on the recording medium, and the user is able to view the broadcast contents of up to 52 hours ago.

In actuality, the broadcast service is not offered around the clock, and in most cases, the service is suspended during such hours as late at night and early in the morning.

When the recording apparatus keeps performing the recording process through such an out-of-service period with the continuous recording function, the recording medium may be filled with meaningless broadcast contents offered during the out-of-service period. When there are some broadcast programs that have already been recorded on the recording medium, they may be overwritten with such meaningless broadcast contents offered during the out-of-service periods. In other words, the data recorded on the recording medium may partly get erased.

The schedules of out-of-service periods of the broadcast service vary depending on the monthly and weekly broadcast schedules, and it would be very troublesome for the users to have to find out the schedules and change the settings so that no recording should be performed during the out-of-service periods.

Moreover, if a big accident or a natural disaster breaks out late at night or early in the morning, a special news program will be often broadcasted during the normal out-of-service periods. In such a case, out-of-service periods and broadcast service periods come about irregularly. If a user has programmed the recording so that the recording is suspended during the out-of-service periods according to the predetermined broadcast schedule, and the broadcast service happens to be resumed by an irregular schedule, a news program for a natural disaster in the middle of the night, for example, will not be recorded.

SUMMARY OF THE INVENTION

An object of the present invention is to provide a recording apparatus that is capable of performing continuous recording process while the out-of-service periods being skipped, without having the user bothered about when the out-of-service periods start and end.

In order to achieve the aforementioned object, the present invention provides a recording apparatus that receives broadcast waves, generates pieces of digital data from the broadcast waves, and writes the generated pieces of digital data onto a recording medium, comprising: a recording unit operable to perform a recording process by writing a piece of digital data onto the recording medium every time a new piece is generated; a determining unit operable to determine a first point of time at which a service period is switched to an out-of-service period, and a second point of time at which an out-of-service period is switched to a service period, the switches being made by a broadcast station; and a controlling unit operable to (i) have the recording unit suspend the recording process at the first point of time, and (ii) have the recording unit resume the recording process at the second point of time.

With this arrangement, it is possible to control so that the recording is not performed during out-of-service periods, and therefore possible to keep utilizing the continuous recording function while reducing electric power consumption late at night and early in the morning.

Furthermore, since the controlling unit has the recording unit resume the recording process every time it detects a point of time at which an out-of-service is switched to a service period, it is possible to have the recording process performed during the service periods, even when out-of-service periods and service periods appear by an irregular schedule. Thus, it is possible to record without fail special news programs that may be broadcasted in the middle of the night.

Here, the recording apparatus may comprise: a tuner operable to receive the broadcast waves and output broadcast signals that has been modulated into the broadcast waves; and an encoder operable to encode the broadcast signals outputted by the tuner to generate the pieces of digital data, wherein the encoder calculates a bit rate to be assigned to the broadcast signals at a time of the encoding, and the out-of-service period is a period during which at least either (a) the broadcast waves are suspended, or (b) the broadcast waves are not suspended, but the bit rate calculated by the encoder is lower than a predetermined threshold value.

With this arrangement, it is possible to have the continuous recording process performed while out-of-service periods being skipped, even in the case of broadcast services by which broadcast waves are suspended during out-of-service periods or a wave testing display such as color bars are broadcasted.

The recording apparatus may have an arrangement wherein the recording unit is a driving apparatus for the recording medium, and when the broadcast waves are suspended, the controlling unit suspends the recording process by suspending an electric power supply both to the encoder and the driving apparatus, whereas when the broadcast waves are not suspended, but the bit rate calculated by the encoder is lower than the predetermined threshold value, the controlling unit suspends the recording process by suspending an electric power supply to the driving apparatus.

With this arrangement, it is possible to reduce electric power consumption at the driving apparatus and the encoder, in the case of broadcast services by which broadcast waves are suspended during out-of-service periods, whereas it is possible to reduce electric power consumption at the driving apparatus, in the case of broadcast services by which a wave testing display such as color bars is broadcasted. It is possible to reduce electric power consumption by different stages depending on types of broadcast services.

Here, the recording apparatus may have an arrangement wherein the bit rate is lower than the predetermined threshold value when the broadcast signals represent a still image.

Here, the recording apparatus may comprise a receiving unit operable to receive from a user a setting as regards to a level of motionlessness of images to be displayed during the out-of-service period, wherein the threshold value varies according to the level of motionlessness received by the receiving unit.

With this arrangement, it is possible to adjust the threshold value so that the recording process should not be performed during out-of-service periods at which the view from the broadcast station is broadcasted.

Here, the recording apparatus may comprise a pointer that indicates a location of writing within an area in the recording medium, wherein the piece of digital data is to be written to a part of the area located after the pointer, and the recording unit (i) adds to the pointer a size of the piece of digital data, when each piece of digital data has been written, and (ii) moves the pointer to a start of the area in the recording medium, when the pointer has reached to an end of the area in the recording medium.

Here, the recording apparatus may have an arrangement wherein the broadcast waves are modulated transport streams, and the recording unit includes a decoder operable to receive a channel selection by a user and obtain from the transport streams a piece of program-specific information corresponding to the selected channel, each of the pieces of digital data to be written is identified by the obtained piece of program-specific information from among pieces of digital data included in the transport streams, and the out-of-service period is a period during which at least either (a) the piece of program-specific information corresponding to the selected channel is not included in the transport streams, (b) the piece of program-specific information corresponding to the selected channel is invalid, or (c) the broadcast waves are suspended.

With this arrangement, it is possible to control so that the recording process is not performed during out-of-service periods of digital broadcast.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 1 shows a mode of using the recording apparatus of the present invention;

FIG. 10 is a timing chart to show the operation of the recording apparatus of the first embodiment;

FIG. 17A shows examples of PMTs;

FIG. 17B shows an example of a PAT; and

DESCRIPTION OF THE PREFERRED EMBODIMENTS

First Embodiment

The following describes embodiments of the recording apparatus of the present invention. Firstly, among different actions related to the apparatus, a mode of using the recording apparatus of the present invention will be explained. FIG. 1 shows a mode of using the recording apparatus of the present invention. As shown in FIG. 1, the recording apparatus, as well as a TV 101 and a remote controller 102, is part of a home server system and serves the purpose of performing continuous recording of the broadcast to be displayed on the TV 101.

It is an exception of the continuous recording process when the recording is suspended during out-of-service periods. Out-of-service periods refer to the periods during which the broadcast proprietors suspend their services of broadcasting information. The information broadcasted by the broadcast proprietors includes such information on economy, social events, press reports, and culture that is meaningful to the users. The out-of-service periods are periods during which either the broadcast of the information itself is suspended or some information that is meaningless to the users is broadcasted, and there are different types as shown in FIG. 2. The following explains types of out-of-service periods with reference to FIG. 2. There are four types of out-of-service periods such as (1) the broadcast waves are suspended (i.e. the broadcast is in a waveless state), (2) the broadcast waves are not suspended, but are the ones for wave testing, (3) the broadcast waves are not suspended and are not the ones for wave testing either, but there is hardly any change in the picture signals, and (4) the broadcast waves include transport streams, and there is no streams to be replayed in these transport streams.

Figure 2A:
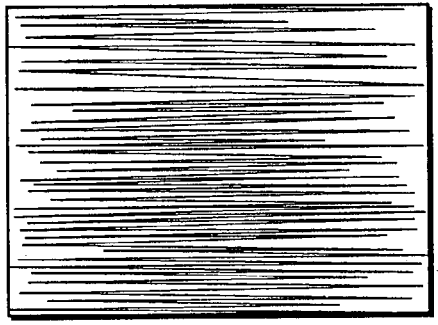
FIGS. 2A through 2D show different types of pictures during out-of-service periods.

FIG. 2A is a picture to be displayed on TV in the case of the first type where the TV shows what is called "TV static" or a screen with a blue background processing.

Figure 2B:
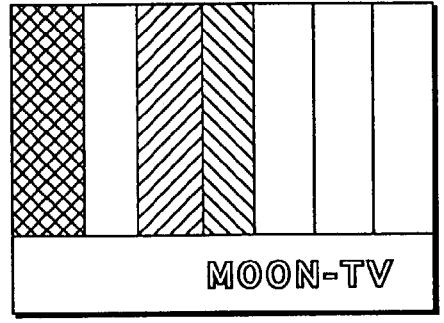

FIG. 2B is a picture to be displayed on TV in the case of the second type where the TV shows a still image such as color bars or a monoscope test pattern.

Figure 2C:
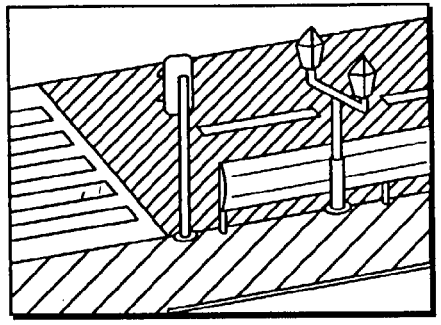

FIG. 2C is a picture to be displayed on TV in the case of the third type where the TV shows a view from the broadcast station. When cars and people pass by near the broadcast station, their images are represented in the picture signals. It means that there are some small changes in the picture signals in the case of the third type.

Figure 2D:
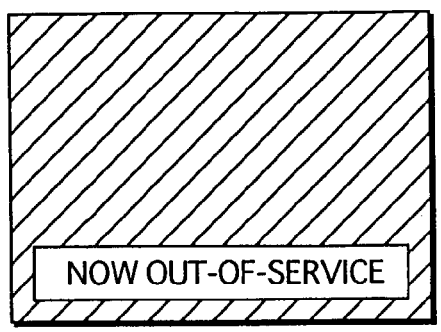

FIG. 2D is a picture to be displayed on TV in the case of the fourth type where there is no stream to be displayed and a message to the users saying something like "Now out-of-service" is displayed by the recording apparatus, as shown in the drawing.

In the first embodiment, a recording apparatus which focuses on out-of-service periods of the first type will be explained. In the second embodiment, a recording apparatus which focuses on out-of-service periods of the first through third types will be explained. In the fifth embodiment, a recording apparatus which focuses on out-of-service periods of the fourth type will be explained.

Here, among different actions related to the recording apparatus of the present invention, a mode of manufacturing the apparatus will be explained. The recording apparatus of the present invention can be industrially manufactured on the basis of the internal structure shown in FIG. 3, which is a diagram to show the internal structure of the recording apparatus. The recording apparatus shown in FIG. 3 comprises hardware components such as a tuner 1, a wavelessness detecting unit 2, an MPEG encoder 3, a track buffer 4, an HDD 5, an MPEG decoder 6, an OSD generator 7, a signal synthesizing unit 8, a microcomputer system 9.

The tuner 1 demodulates, out of TV broadcast waves, certain broadcast signals on a channel selected by the user, and outputs picture signals and sound signals to the MPEG encoder 3.

The wavelessness detecting unit 2 detects whether or not the channel selected by the user is in a waveless state. When the channel selected by the user comes into a waveless state, the wavelessness detecting unit 2 determines a point of time at which a switch from a service period to an out-of-service period has occurred. When the channel selected by the user comes into a non-waveless state, the wavelessness detecting unit 2 determines a point of time at which a switch from an out-of-service period to a service period has occurred.

The MPEG encoder 3 generates VOBUs (Video Object Units) as per the DVD-video Recording Standard by encoding analog video signals and analogue audio signals. A VOBU is a smallest decodable unit of a VOB that includes (i) a GOP (Group of Pictures) which is a collection of pieces of 0.4 to 1.0 second-long picture data and (ii) audio frames to be replayed concurrently with such a GOP. A method called VBR (Variable Bit Rate) is used for the encoding of the analog video signals. In the VBR method, the bit rate assignment is set at high for signal intervals in the analog video signals when they are for complicated images. Conversely, the bit rate assignment is set at low for signal intervals whey they are for simple images. With such adjustments, it is possible to have a bit rate average of a certain value, and thus to avoid variations in image quality.

At times of recording, the track buffer 4 temporarily stores the VOBU generated by the MPEG encoder 3, and outputs it to the HDD 5. At times of replaying, the track buffer 4 temporarily stores the VOBU read from the HDD 5, and outputs it to the MPEG encoder 3.

The HDD (HD Drive) 5 has an HD area and performs the reading and writing of VOBUs from and to the HD area. The HD area has a capacity in which N-hour long VOBUs can be written. VOBUs are divided into the size of ECC blocks in the HD, and written to the ECC blocks in the HD.

The MPEG decoder 6 decodes the VOBUs read from the MPEG encoder 3 so as to obtain analogue video signals and audio signals.

The OSD generator 7 generates an OSD (On Screen Display) and outputs it to the signal synthesizing unit 8 so that the OSD gets synthesized with the picture data. The OSD is for drawing a menu which can be changed according to the user's operation to provide a GUI for the user.

The signal synthesizing unit 8 synthesizes the picture data with the OSD by combining horizontal lines forming the uncompressed picture data and horizontal lines of the OSD, and then converts the result to picture signals for a TV. When combining these horizontal lines, the signal synthesizing unit 8 is able to adjust the combining ratios so as to, for example, cover and hide the picture data with the OSD, or have the picture data seen through the OSD.

The microcomputer system 9 comprises the CPU 9a, the RAM 9b, and the command ROM 9c, and has systematic control over the recording apparatus by having the CPU 9a execute a program stored in the command ROM 9c. The program stored in the command ROM 9c collaborates with the hardware resources constituting the microcomputer system 9. The program functions as achieving means such as the record controlling unit 10 and the replay controlling unit 1, in collaboration with the hardware resources constituting the microcomputer system 9.

The following describes the achieving means in which the program and the hardware resources collaborate.

Figure 4A:
FIGS. 4A through 4D show a typical recording process by the record controlling unit 10.
Figure 4B:
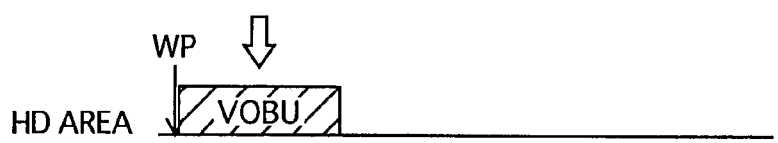
Figure 4C:
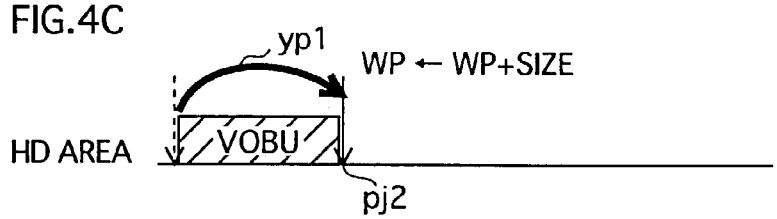
Figure 4D:
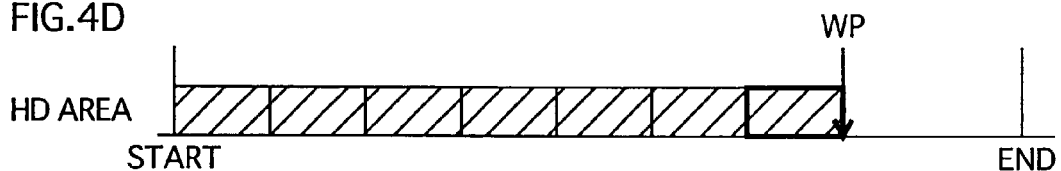

The record controlling unit 10 controls the MPEG encoder 3 and the HDD 5 to perform the recording process. The recording process is to write a VOBU to an area located after a writing pointer (referred to as WP) within the HD area every time a VOBU is stored in the track buffer 4, and subsequently advance the location of the WP by the size of the VOBU. FIGS. 4A through 4D and 5A through 5C show a typical recording process by the record controlling unit 10. The WP is set at the location pj1 in FIG. 4A. When a VOBU is stored in the track buffer 4, the VOBU gets written to the area located after the WP as shown in FIG. 4B, and subsequently the WP gets shifted to the location pj2 as shown with the arrow ypl in FIG. 4C. Then, the process shown in FIGS. 4A to 4C will be repeated. By this repetition, the HD area gets filled up with VOBUs as shown in FIG. 4D.

Figure 5A:
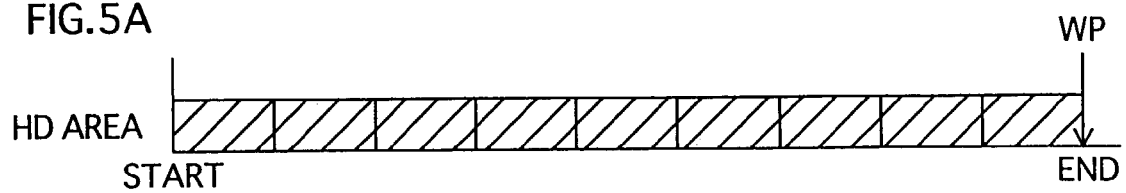
FIGS. 5A through 5C show a typical recording process by the record controlling unit 10.
Figure 5B:
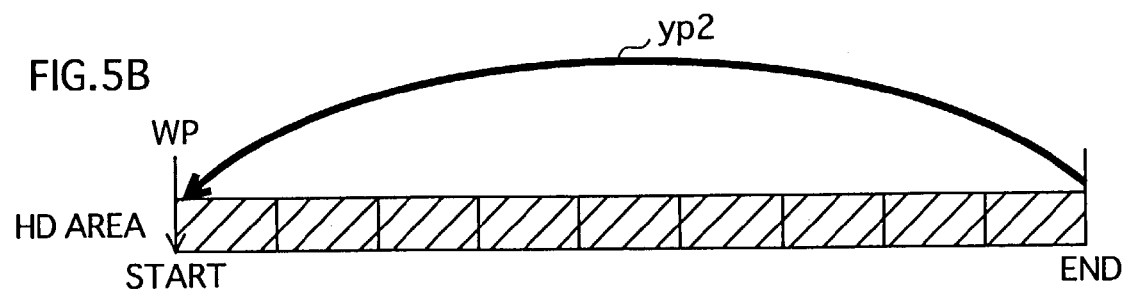
Figure 5C:
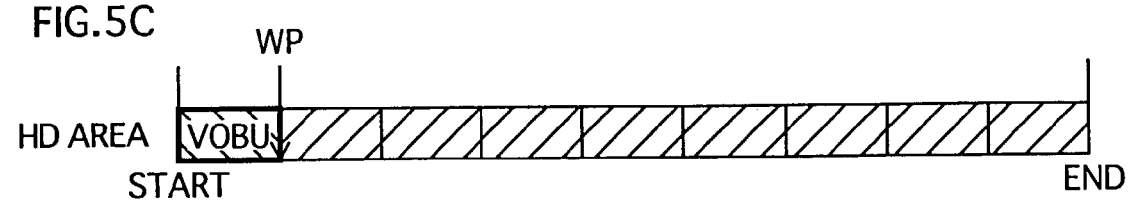

At times of performing the recording process, the record controlling unit 10 judges if the WP has reached the end of the HD area or not. When the WP has reached the end of the HD area as shown in FIG. 5A, the record controlling unit 10 puts the WP back to the start of the HD area as shown with the arrow yp2 in FIG. 5B, and then writes a VOBU stored in the track buffer 4 to an area located after the WP within the HD area as shown in FIG. 5C. Since the WP is put back at the start of the HD area after having reached the end of the HD area, some of the VOBUs that had been previously written to the HD get overwritten with newly generated VOBUs. As long as the MPEG encoder 3 keeps encoding broadcast signals, the recording process continues, and thus the record controlling unit 10 actualizes the continuous recording function.

There is an exception of the continuous recording process performed by the record controlling unit 10 when the wavelessness detecting unit 2 detects an out-of-service period. More specifically, when the wavelessness detecting unit 2 detects a point of time at which a service period is switched to an out-of-service period, the record controlling unit 10 suspends the electric power supply to both the HDD 5 and the MPEG encoder 3 so as to stop the recording process, whereas when the wavelessness detecting unit 2 detects a point of time at which an out-of-service period is switched to a service period, the record controlling unit 10 supplies the electric power to both the HDD 5 and the MPEG encoder 3 so as to resume the recording process.

The replay controlling unit 11 controls the MPEG decoder 6 and the HDD 5 to perform replay process. The replay process is to read the VOBU from where a reading pointer (referred to as RP) is within the HD area, and output it to the MPEG decoder 6, and to subsequently advance the location of the RP by the size of the VOBU. At times of performing the replay process, the replay controlling unit 11 judges if the RP has reached the end of the HD area or not, and when the RP has reached the end of the HD area, the replay controlling unit 11 puts the RP back to the start of the HD area, and then writes a VOBU stored in the track buffer 4 to an area located after the RP within the HD area. When the RP has reached where the WP is, the replay process stops.

Figure 6:
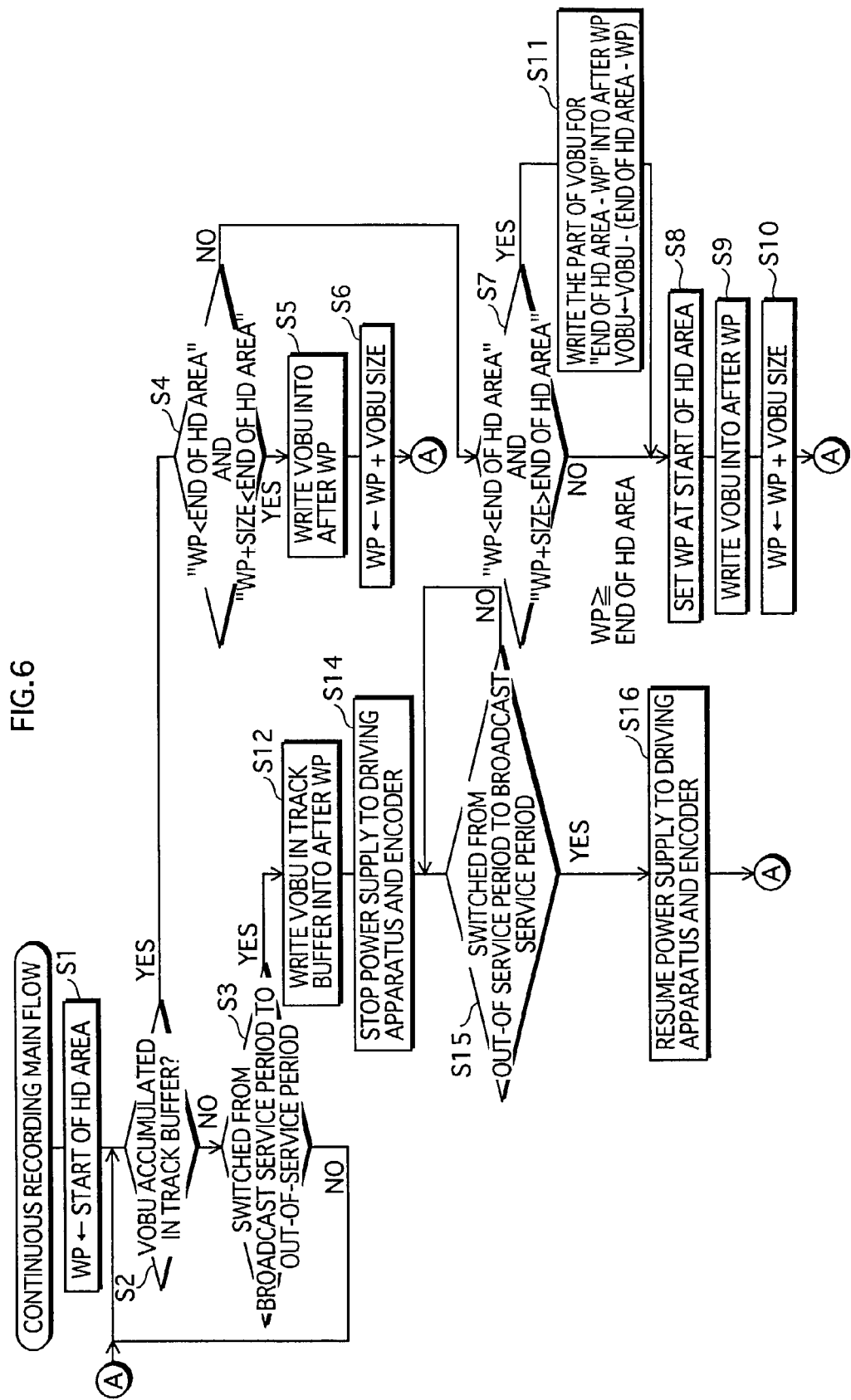
FIG. 6 is a flowchart to show the processing procedure of the record controlling unit 10.

The record controlling unit 10 can be produced by writing a computer-readable program that executes the procedure shown in the flowchart of FIG. 6 in a programming language such as the C language. The following describes the process performed by the record controlling unit 10 with reference to the flowchart.

In Step S1, the WP is set at the start of the HD area, and the HDD 5 and the MPEG encoder 3 are instructed to start the recording process, and then the process flow advances to a loop process made up of Steps S2 and S3. Step S2 is an event-wait step to wait for a VOBU to be stored in the track buffer 4, whereas Step S3 is an event-wait step to wait for a service-period to be switched to an out-of-service period. When a VOBU gets stored in the track buffer 4, the process flow advances to Steps S4 through S10. In Steps S4 through S10, after a judgment is made in Step S4, a VOBU gets written to an area located after the WP (Step S5), and then the WP is advanced by the size of the VOBU (Step S6), before the process flow returns to Steps S2 and S3.

Figure 7A:
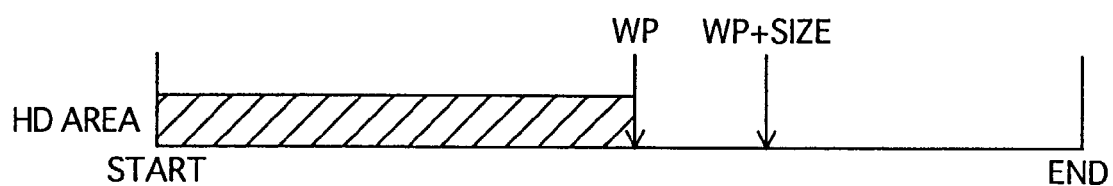
FIGS. 7A through 7C illustrate a VOBU writing in the case where a WP is located before the end of the HD area and also the address after adding the VOBU size to the WP is still located before the end of the HD area.
Figure 7B:
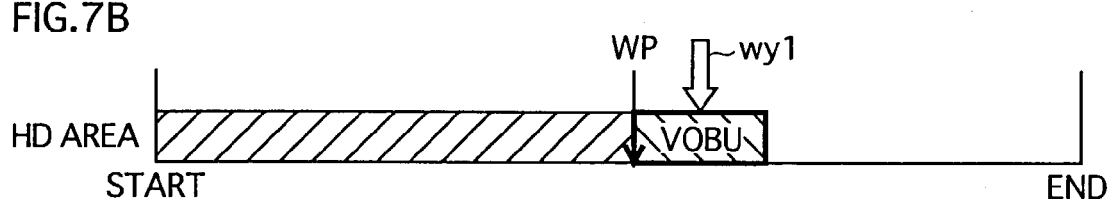
Figure 7C:
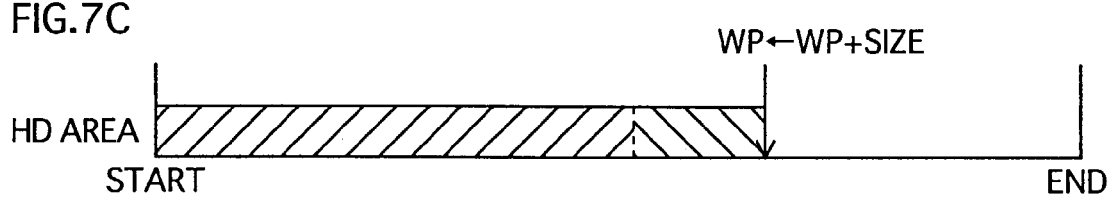
Figure 8A:
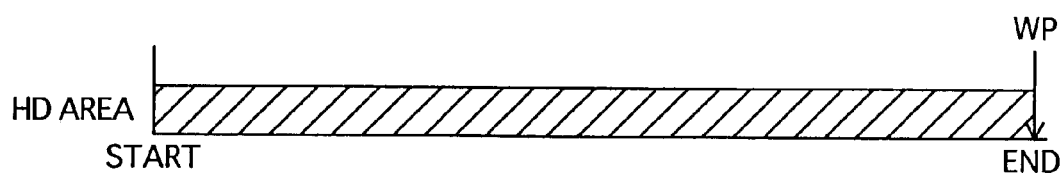
FIG. 8A through 8C illustrate a VOBU writing in the case where a WP has reached the end of the HD area.
Figure 9A:
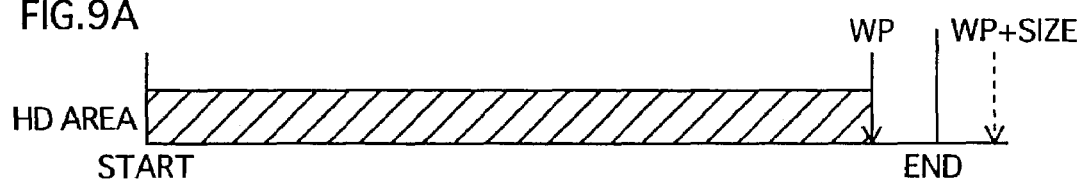
FIGS. 9A through 9D illustrate a VOBU writing in the case where a WP is near the end of the HD area.

Out of three possible cases shown in FIGS. 7A, 8A, and 9A, the judgment result made in Step S4 is in affirmative in the case of FIG. 7A. In FIG. 7A, a condition is satisfied where the WP is located before the end of the HD area, and also the address after adding the size of the VOBU to the WP is still located before the end of the HD area. In such a case, it is possible to write the VOBU stored in the track buffer 4 to the HD area without any problem. Thus, the VOBU stored in the track buffer 4 gets written to the area located after the WP as shown with the arrow wy1 in FIG. 7B, and the WP gets advanced as shown in FIG. 7C.

Figure 8B:
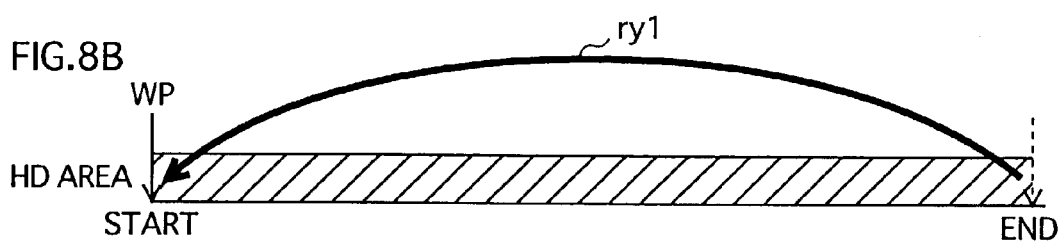
Figure 8C:
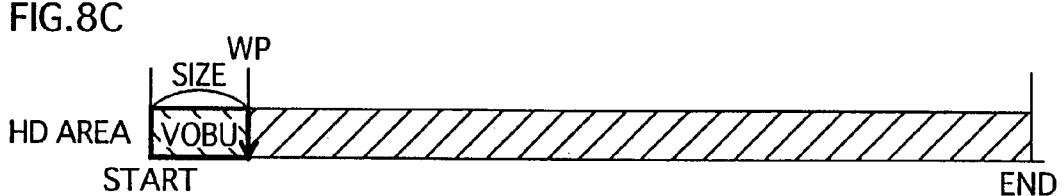

If the condition at Step S4 is not satisfied, a judgment is made if a condition at Step S7 is satisfied or not. Out of the three possible cases shown in FIGS. 7A, 8A, and 9A, the condition at Step S7 is not satisfied in the case of FIG. 8A. When the WP has already reached the end of the HD area as shown in FIG. 8A, the judgment result at Step S7 is "No", thus the WP is put back at the start of the HD area as shown with the arrow ry1 in FIG. 8B (Step S8). Subsequently, the VOBU is written to an area located after the WP as shown in FIG. 8C (Step S9), and then the WP is advanced by the size of the VOBU before the process flow returns to the loop process made up of Steps S2 and S3 (Step S10).

Figure 9B:
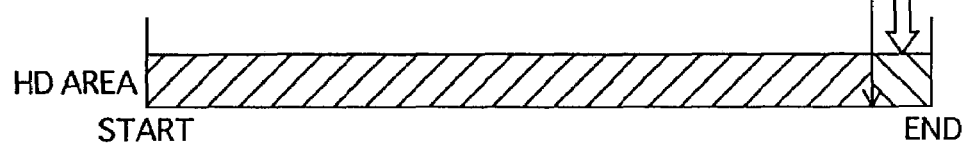
Figure 9C:
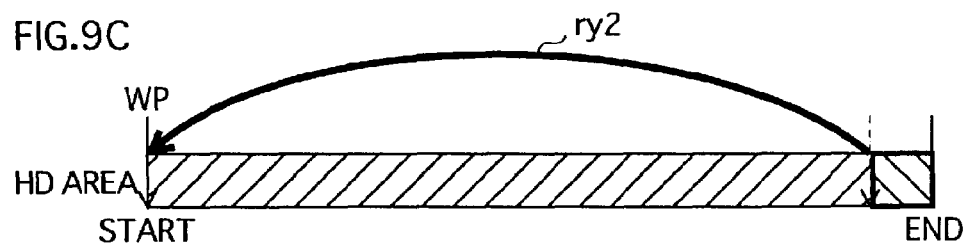
Figure 9D:
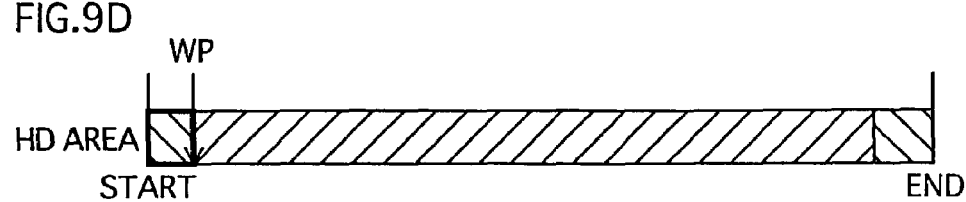

The condition at Step S7 is satisfied when the WP is located before the end of the HD area, but the address after adding the size of the VOBU to the WP is located after the end of the HD area as shown in FIG. 9A. If this condition is satisfied, (i.e. the judgment result at Step S7 is "Yes"), a part of the VOBU as large as "the end of the HD area—the WP" gets written to the area located after the WP as shown with the arrow hy1 in FIG. 9B, and the part that is "VOBU— (the end of the HD area—the WP)" is newly set as the VOBU (Step S11), and then the WP is put back to the start of the HD area as shown with the arrow ry2 in FIG. 9C (Step S8). Subsequently, the VOBU is written to the area located after the WP as shown in FIG. 9D (Step S9), and the WP gets advanced by the size of the VOBU, and the process flow returns to the loop process made up of Steps S2 and S3 (Step S10).

If an event of a service period being switched to an out-of-service period occurs during the loop process made up of Steps S2 and S3, the VOBU in the track buffer 4 gets written to the area located after the WP (Step S12), and the electric power supply to both the HDD 5 and the MPEG encoder 3 gets suspended (Step S14). The process flow waits for the out-of-service period to be switched to a service period (Step S15). When this switch occurs, the electric power supply to both the HDD 5 and the MPEG encoder 3 gets resumed (Step S16).

Since the resuming of the recording process is performed through resuming the supply of electric power to the MPEG encoder 3 and the HDD 5 after a switch from an out-of-service period to a service period is detected, there will be a short time lag before a VOBU actually gets recorded, but losing the recording due to such a time lag is not likely to be a big loss. The reason for this is because usually there is some announcement of the broadcast station or commercial messages at the beginning of the service period early in the morning, and it is hard to imagine that the user gets disappointed by missing some of those.

FIG. 10 is a timing chart to show the operation of the recording apparatus of the first embodiment.

The first segment of FIG. 10 shows changes in the voltage supplied to the tuner; the second segment shows changes in the result by the wavelessness detecting unit 2; the third segment shows changes in the voltage supplied to the MPEG encoder 3; the fourth segment shows changes in the voltage supplied to the HDD 5.

In the second segment of FIG. 10, a service period is switched to an out-of-service period at the point of time jt1, and the out-of-service period is switched to a service period at the point of time jt2. The wavelessness detecting unit 2 detects those points of time at which the service period is switched to the out-of service period and the out-of-service is switched to the service period, and the level of the voltage applied to the HDD 5 is lowered from Vcc to 0V as shown with the arrow yj1 at the point of time jt1. In the same manner, the level of the voltage applied to the MPEG encoder 3 is lowered from Vcc to 0V as shown with the arrow yj2 at the point of time jt2. As a result, there is no electric power consumption at the HDD 5 and the MPEG encoder3.

In two to three hours, the out-of-service period will be finished, and the service period will begin. The level of the voltage applied to the HDD 5 is raised from 0V to Vcc as shown with the arrow yj3 at the point of time jt2. In the same manner, the level of the voltage applied to the MPEG encoder 3 is raised from 0V to Vcc as shown with the arrow yj4. After the levels of the electric power voltage are restored in such ways, the encoding by the MPEG encoder 3 and the recording process by the HDD 5 get resumed.

As so far explained, according to the first embodiment, it is possible to control so that the recording process is not performed during out-of-service periods, and therefore possible to keep utilizing the continuous recording function while reducing the electric power consumption late at night and early in the morning.

Furthermore, since the controlling unit has the recording unit resume the recording process every time it detects a point of time at which an out-of-service is switched to a service period, it is possible to have the recording process performed during the service periods, even when out-of-service periods and service periods period appear by an irregular schedule. Thus, it is possible to record without fail special news programs that may be broadcasted in the middle of the night.

Second Embodiment

The second embodiment is designed to overcome a flaw in the out-of-service period detection function of the first embodiment. Unlike old days, only a small number of broadcast stations present wavelessness (i.e. suspend broadcast waves) during out-of-service periods, and many stations nowadays broadcast some wave testing displays such as color bars or the view from the station during out-of-service periods. Those broadcast signals during the out-of-service periods have such unique characteristics that there are extremely small changes in the signals. In the second embodiment, detection of out-of-service periods with such characteristics is performed with use of the MPEG encoder 3.

Figure 3:
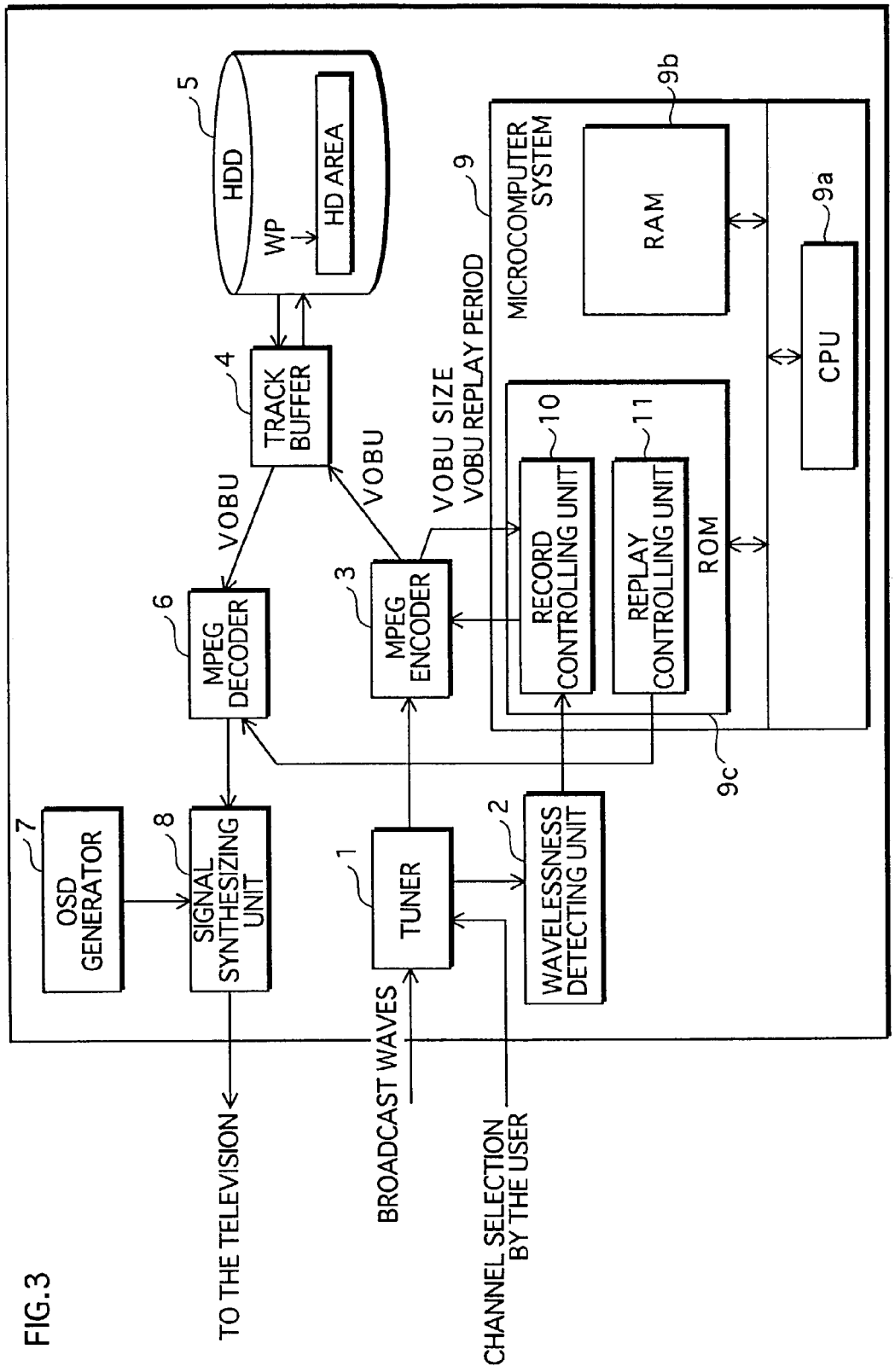
FIG. 3 is a diagram to show the internal structure of the recording apparatus.
Figure 11:
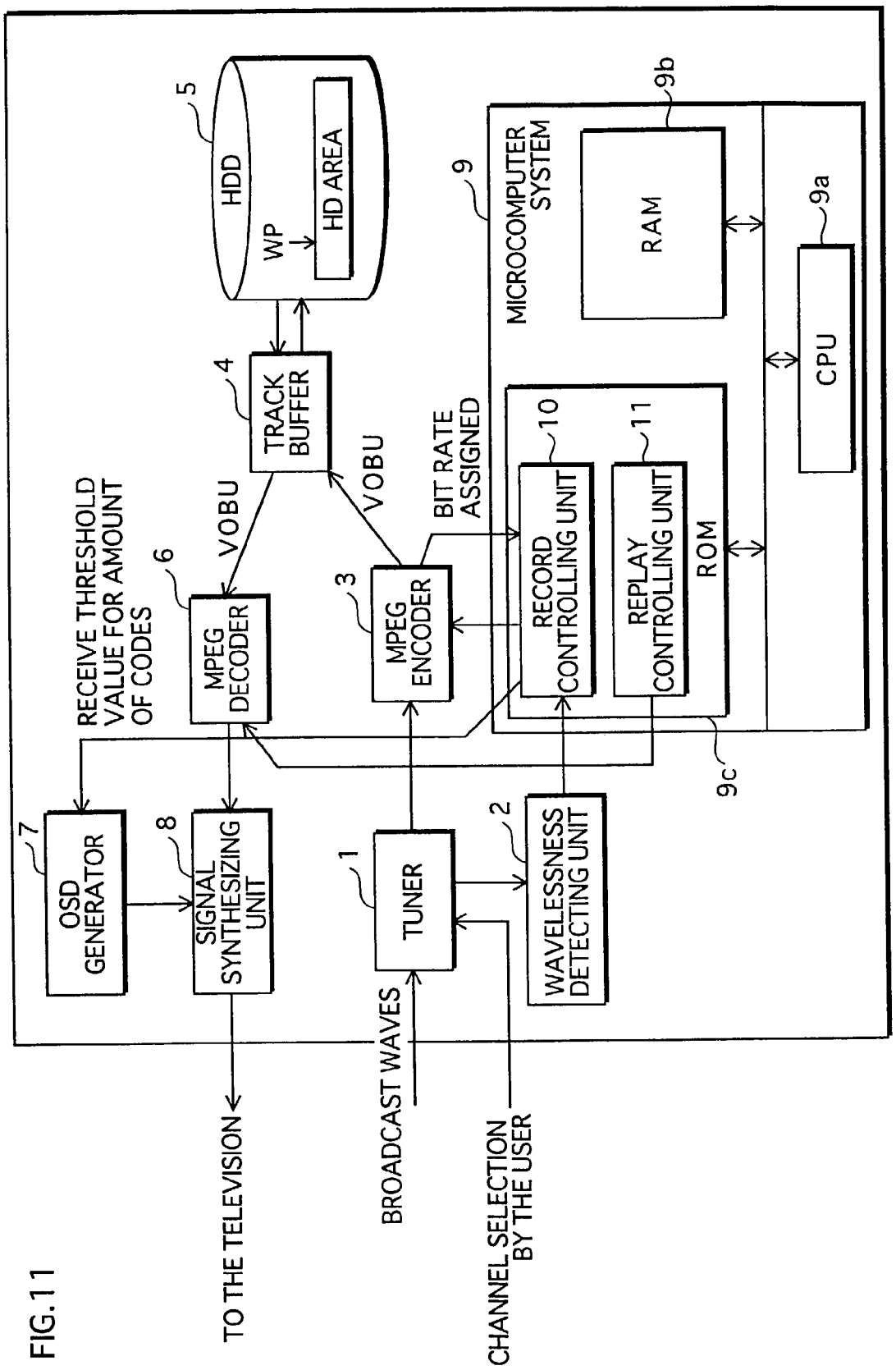
FIG. 11 is a diagram to show the internal structure of the recording apparatus of the second embodiment.

FIG. 11 is a diagram to show the internal structure of the recording apparatus of the second embodiment. The difference between FIG. 11 and FIG. 3 is that the record controlling unit 10 receives from the MPEG encoder 3 notification of the bit rate to be assigned.

The following explains the detection of a point of time at which the switch occurs with use of the MPEG encoder 3:

As explained in the first embodiment, since the MPEG encoder 3 assigns an optimal bit rate depending on how much motion there is in the broadcast signals, the bit rate assigned becomes extremely small during a period when color bars or the view from the broadcast station is broadcasted. In the second embodiment, the record controlling unit 10 detects a period during which such an extremely small bit rate is assigned as an out-of-service period.

In order to use the MPEG encoder 3 for detecting a point of time at which a service period is switched over to an out-of-service period, the record controlling unit 10 has the MPEG encoder 3 monitor the broadcast signals. When the bit rate assigned by the MPEG encoder 3 gets lower than a predetermined value, the record controlling unit 10 treats it as a point of time at which a service period is switched over to an out-of-service period, and suspends the electric power supply to the HDD 5. The reason for not suspending the electric power supply to the MPEG encoder 3, unlike the first embodiment, is because the MPEG encoder 3 keeps assigning the bit rate even during the out-of-service periods. In one or two hours when the bit rate assigned by the MPEG encoder 3 gets high again, the record controlling unit 10 treats it as a point of time at which an out-of-service period is switched over to a service period, and restarts the electric power supply to the HDD 5 so as to resume the recording process.

Between the two ways of detecting an out-of-service period with use of the MPEG encoder 3 and with use of the wavelessness detecting unit 2, the latter i.e. the one with use of the wavelessness detecting unit 2 is given priority. More specifically, once the wavelessness detecting unit 2 has detected a switch to an out-of-service period, there will be no attempts made to detect out-of-service periods by the MPEG encoder 3. The reason for this is because if the broadcast signals are in a waveless state, then there is no doubt that it is an out-of-service period. The detection of an out-of-service period by the MPEG encoder 3 is performed only when the wavelessness detecting unit 2 has detected that it is a service period of broadcast signals.

Figure 12:
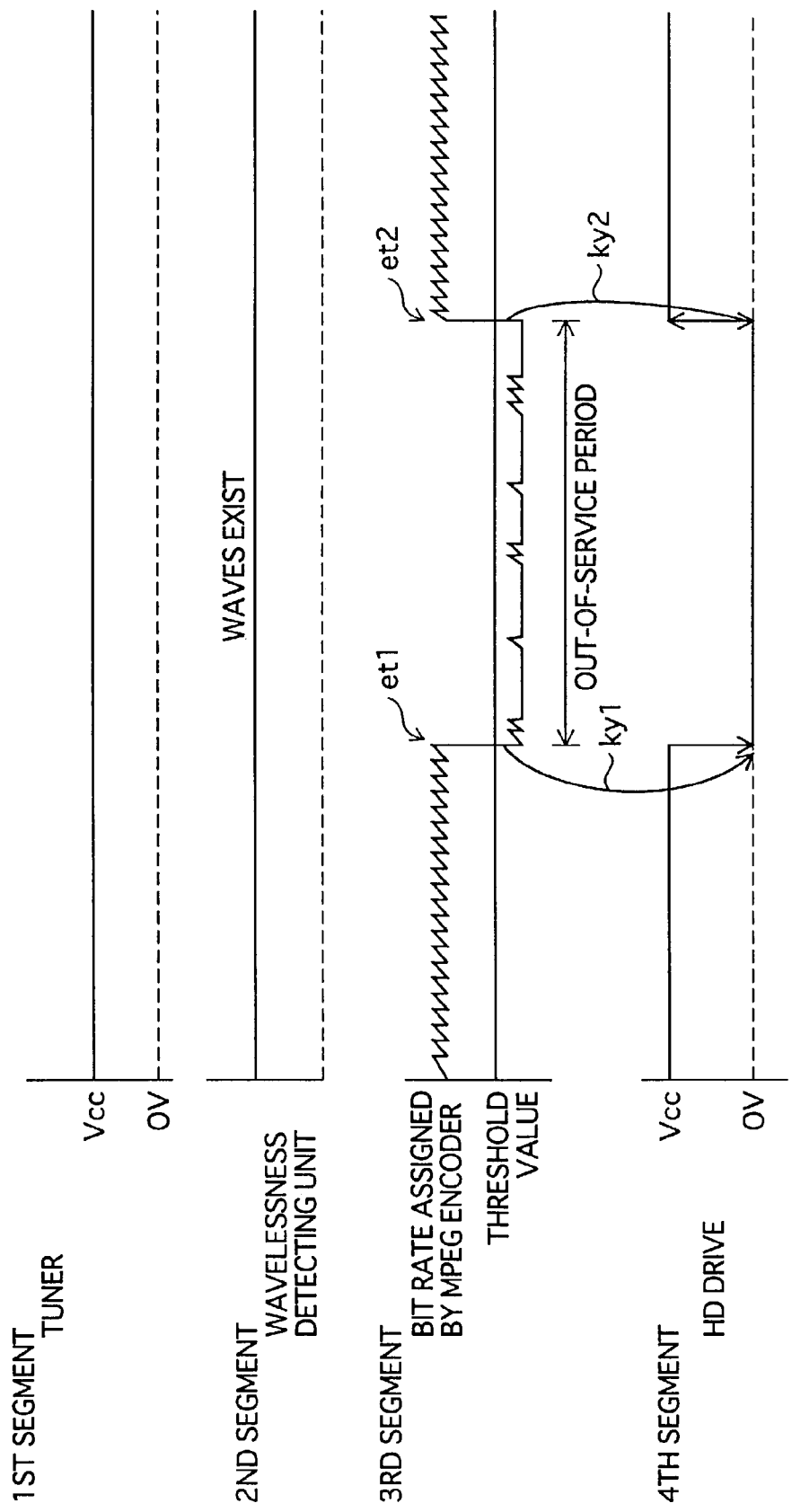
FIG. 12 is a timing chart to show the operation of the recording apparatus of the second embodiment.

FIG. 12 is a timing chart to show the operation of the recording apparatus of the second embodiment.

The first segment shows changes in the voltage supplied to the tuner; the second segment shows changes in the result by the wavelessness detecting unit 2; the third segment shows changes in the bit rate assigned by the MPEG encoder 3; the fourth segment shows changes in the voltage supplied to the HDD 5.

In the second segment of FIG. 12, the result of detection by the wavelessness detecting unit 2 shows only a state where broadcast waves exist, and does not show a waveless state.

In the third segment of FIG. 12, the bit rate assigned by the MPEG encoder 3 is higher than the threshold value at first, and lower than the threshold value between the points of time et1 and et2, and again higher than the threshold value after the point of time et2.

The record controlling unit 10 monitors such changes in the bit rate assigned, and lowers the level of the voltage applied to the HDD 5 from Vcc to 0V as shown with the arrow ky1 at the point of time et1.

In two to three hours, the out-of-service period will be finished, and the service period will begin. The level of the voltage applied to the HDD 5 is raised from 0V to Vcc as shown with the arrow ky2 at the point of time et2. After the level of the electric power voltage is restored in such a way, the recording process by the HDD 5 gets resumed.

As so far explained, according to the second embodiment, it is possible to detect those points of time at which a service period is switched to an out-of-service period and an out-of-service period is switched to a service period from the bit rate assigned by the MPEG encoder 3, even if color bars or the view from the broadcast station is being broadcasted during an out-of-service period. Thus, it is possible to perform the control through suspension of electric power supply during out-of-service periods while reducing the electric power consumption in the recording apparatus.

Third Embodiment

In the second embodiment, detection of service periods and out-of-service periods are performed according to the bit rates assigned to the broadcast signals by the MPEG encoder 3. It is almost impossible to avoid making errors in such detection process. The reason is because there are more or less changes in data in the broadcast signals especially when a view from the broadcast station is broadcasted during an out-of-service period, although it may not be a case when a completely still image such as color bars is broadcasted. There may be possibilities that an out-of-service period is erroneously detected as a service period, or a service period is erroneously detected as an out-of-service period because of those changes in the signals.

In the third embodiment, the user is able to set a criterion for detecting out-of-service periods in terms of a bit rate to be assigned. Thus, the record controlling unit 10 in the third embodiment has the OSD generator 7 display a menu so as to receive a setting of a threshold value.

Figure 13:
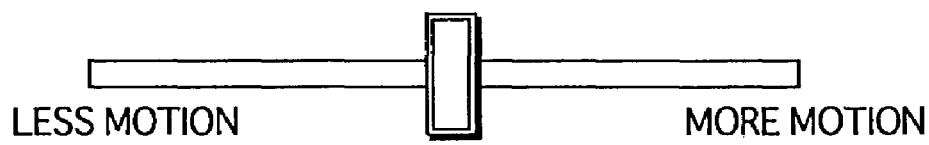
FIG. 13 shows an example of a menu to receive from the user a setting of the criterion for detecting out-of-service periods.

FIG. 13 shows an example of a menu to receive from the user a setting of the criterion for detecting out-of-service periods. The menu in this drawing includes a slide bar which is used to receive a parameter of "motionlessness" during out-of-service periods.

By moving the slide bar towards the left, the criterion is set with a smaller amount of motion, whereas by moving the slide bar towards the right, the criterion is set with a larger amount of motion. When the "motionlessness" is set with the slide bar, the record controlling unit 10 calculates a criterion of a bit rate to be assigned based on the setting, and detects that it is an out-of-service period of broadcast signals if the bit rate assigned to the broadcast signals is lower than the criterion.

There is no limitation as to when to set the criterion with the menu shown in FIG. 13, and the setting may be performed during the recording process. It would be however preferable to receive the setting between Steps S2 and S3 in the example shown FIG. 6, because this way it is possible to give priority to the recording during the out-of-service periods to be overwritten first, by setting the criterion prior to the judgment in Step S3.

As so far explained, according to the third embodiment, it is possible to receive from the user an input of a unique parameter of "motionlessness", and set a criterion for detection of out-of-service periods in terms of a bit rate to be assigned based on the input, therefore possible to seek an optimal criterion for detecting out-of-service periods from broadcast signals such as the ones for a view from a broadcast station. Since the setting represents the user's sense via the slide bar, even users who are not familiar with the encoding method by the MPEG encoder 3 are able to seek an optimal criterion. Additionally, it is also acceptable to receive from the user an input of length of time to be a criterion for detection of out-of-service periods, in addition to motionlessness. In other words, another slide bar may be displayed in the menu shown in FIG. 13, so that the length of time for the threshold value to remain could be inputted.

Fourth Embodiment

In the third embodiment, the recording apparatus suspends the recording process during out-of-service periods. There is however a problem that, since the user sets the criterion for detecting out-of-service periods in terms of a bit rate to be assigned, a view from the broadcast station may be erroneously recorded in the HD area when the criterion is set at too low.

The fourth embodiment relates to an improvement with a garbage collection function by which the VOBUs that have already been written to the HDD 5 are given priority for being overwritten.

Figure 14:
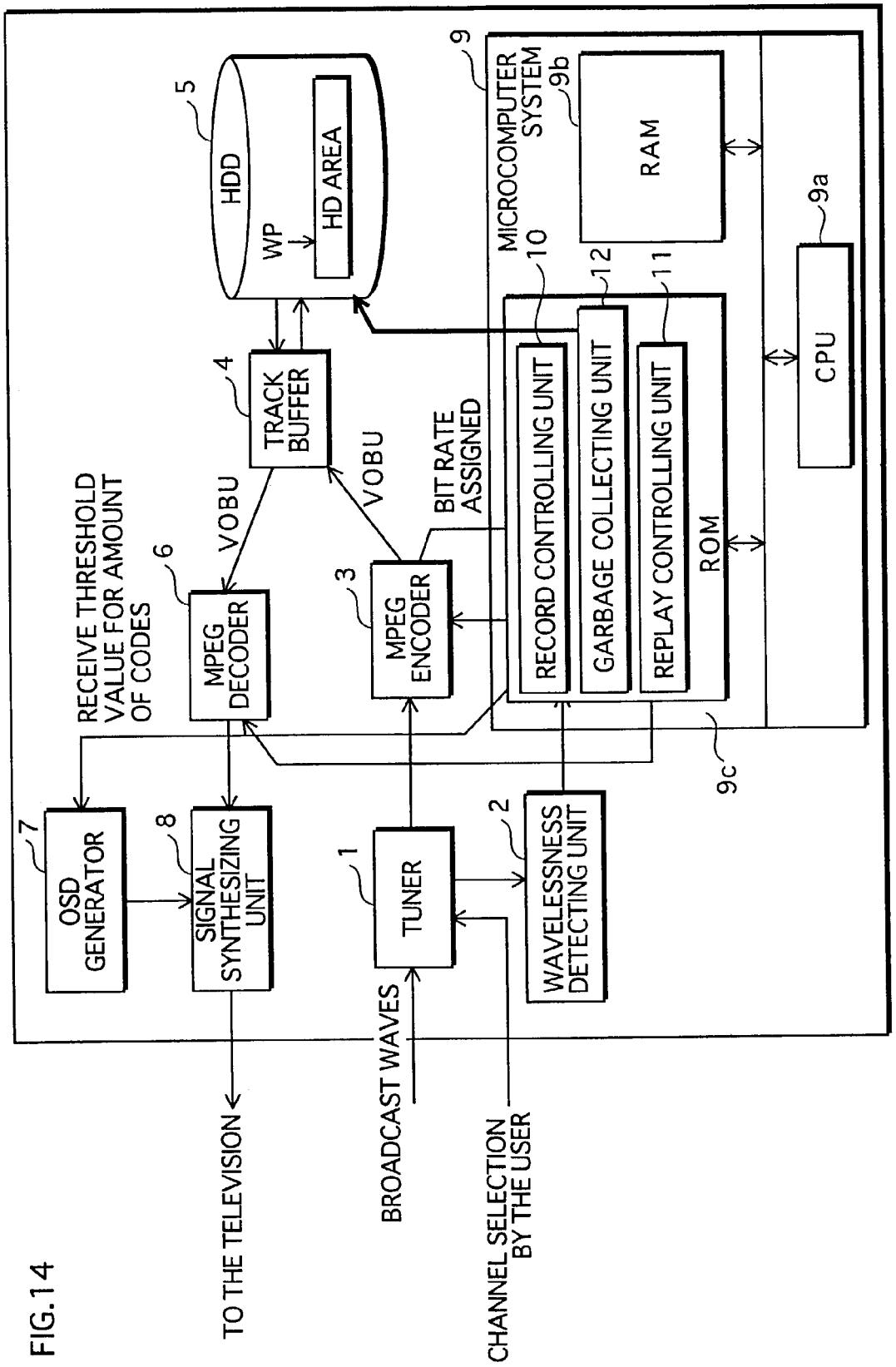
FIG. 14 is a diagram to show the internal structure of the recording apparatus of the fourth embodiment.

FIG. 14 is a diagram to show the internal structure of the recording apparatus of the fourth embodiment. An improvement made compared to FIG. 3 is the addition of a garbage collecting unit 12 in FIG. 14.

The garbage collecting unit 12 detects such VOBUs among the VOBUs written in the HD area that represent out-of-service periods, and performs garbage collection so that such detected VOBUs should be moved to the start of the HD area.

Figure 15:
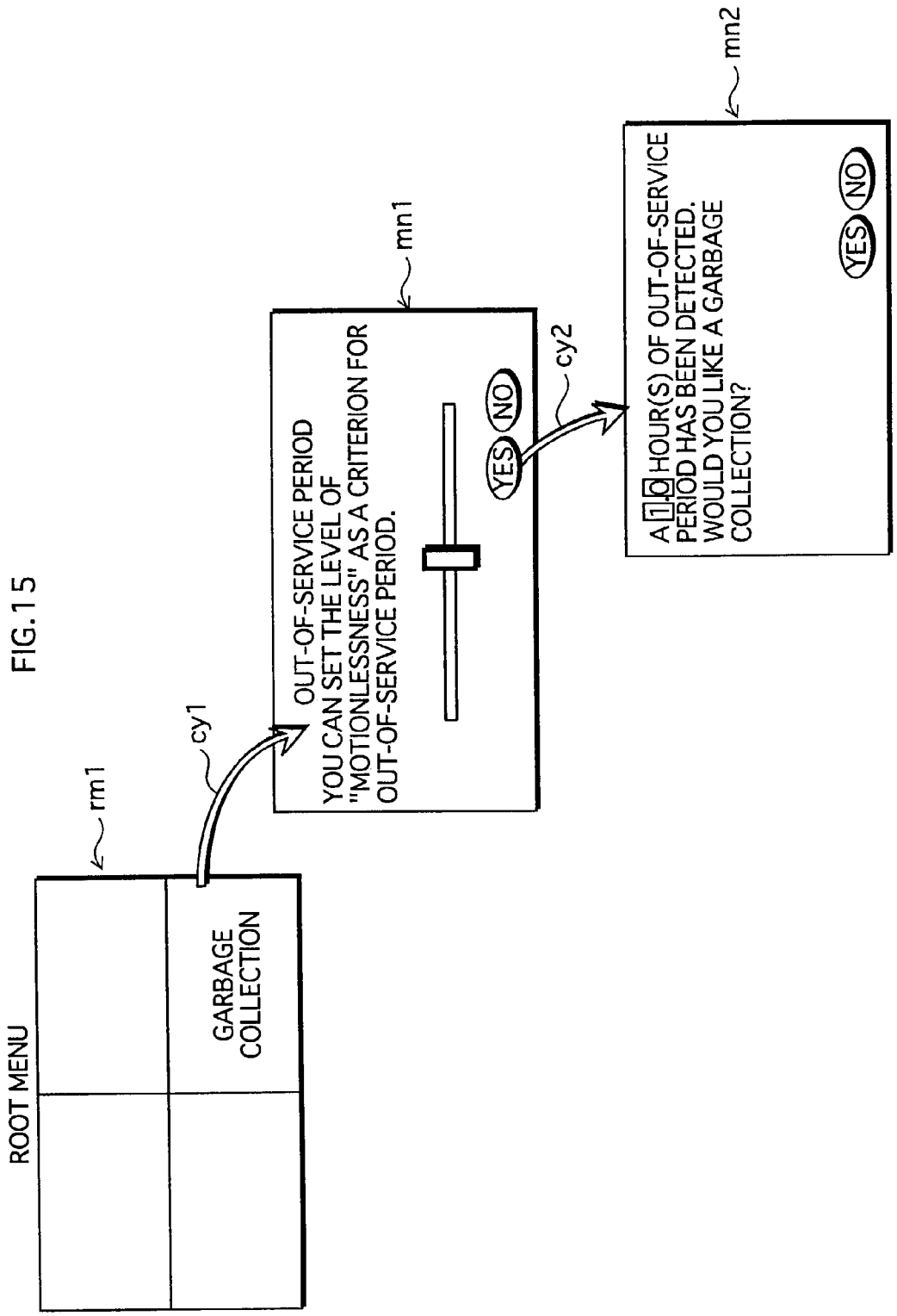
FIG. 15 shows menus to receive a user setting for detecting out-of-service periods.

With menus shown in FIG. 15, such detections of out-of-service periods can be performed. FIG. 15 shows the menus to receive a user setting for detecting out-of-service periods. The arrows cy1 and cy2 indicate transitions between the menus. The root menu rm1 has an item called garbage collection, and when it is selected, the menu mn1 will be displayed. The menu mn1 is the same menu as shown in FIG. 13, and is used to receive a criterion of motionlessness during out-of-service periods. When a level of motionlessness is set in the menu mn1, the garbage collecting unit 12 detects such VOBUs that represent out-of-service periods within the HD area. The menu mn2 indicates to the user a length of time of VOBUs representing the out-of-service periods. The menu mn2 includes buttons to reflect the user's decision and when the button for Yes is pushed, the continuous recording process by the record controlling unit 10 gets suspended and garbage collection process starts.

Figure 16A:
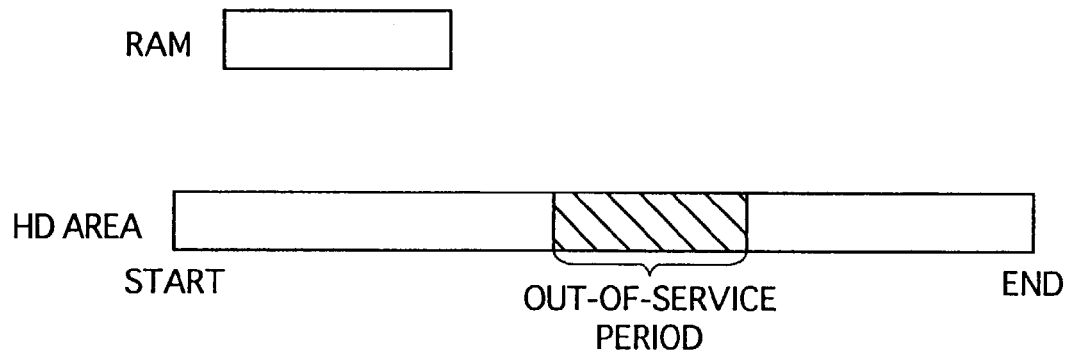
FIGS. 16A through 16C shows the procedure of garbage collection process.
Figure 16B:
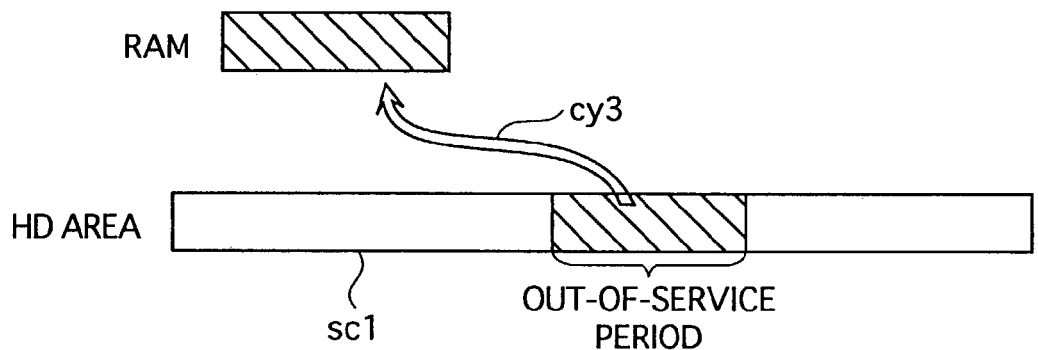
Figure 16C:
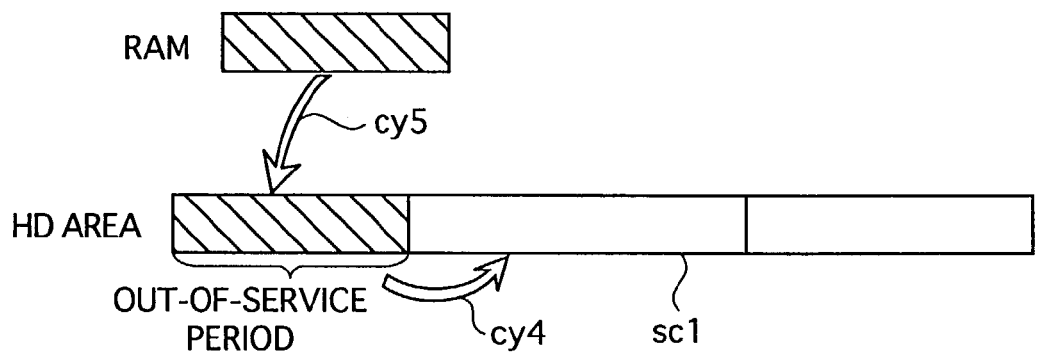

FIGS. 16A through 16C shows the procedure of garbage collection process. In FIG. 16A, it is assumed that the recording during an out-of-service period is located around the middle of the HD area. When the recording during the out-of-service period is detected, the garbage collecting unit 12 once saves the recording in RAM 9b as shown with the arrow cy3 in FIG. 16B. Subsequently, the part sc1 which precedes the out-of-service period recording gets moved towards the end as shown with the arrow cy4. Then, the out-of-service period recording saved in RAM 9b gets written to the vacant area as shown with the arrow cy5. Thus, the out-of-service period recording is located at the start of the HD area.

This way, when the recording apparatus resumes the continuous recording process, and the WP is put back from the end to the start of the HD area, the out-of-service period recording at the start of the HD area is given priority for being overwritten first.

Even when a view from the broadcast station or the like is erroneously written in the HD area, it is possible to overwrite this kind of out-of-service period recording first with priority.

In addition, it is also possible to move the out-of-service period recording to an area located immediately after the WP, or to an area located at a certain length of time (e.g. 10 minutes) after the WP.

Furthermore, it is also possible to manage pointer information that designates out-of-service periods, and give priority of being overwritten to the area that is specified by the pointer information. This way, it is not necessary to move the recording made during an out-of-service period.

Fifth Embodiment

The fifth embodiment relates to an improvement for detecting out-of-service periods in digital broadcast. In digital broadcast system, video streams and audio streams that constitute different programs are broadcasted together in multi-program-type transport streams. PSI (Program Specific Information: MPEG standard) included in the multi-program-type transport streams defines which video stream and audio stream constitute a program. There are different types of PSI such as PMTs and PATs. A PMT (Program Map Table) identifies which video stream and audio stream included in a plurality of streams multiplexed on the multi-program-type transport streams constitute each of broadcasted programs. FIG. 17A shows examples of PMTs. It is understood that the broadcast program for PMT #1 in the drawing is constituted from a video stream with PID=001 and an audio stream with PID=002. On the other hand, a PAT (Program Allocation Table) indicates which PMT should be referred to in order to obtain each of the broadcast programs transferred on the multi-program-type transport streams. FIG. 17B shows an example of a PAT. From this drawing, it is understood that the stream structure of the broadcast program #1 is indicated by PMT #1, and the stream structure of the broadcast program #2 is indicated by PMT #2. Since a piece of PSI is provided for each broadcast program on each broadcast channel, it is possible to judge whether it is an out-of-service period or a service period by monitoring if PSI exists.

Figure 18:
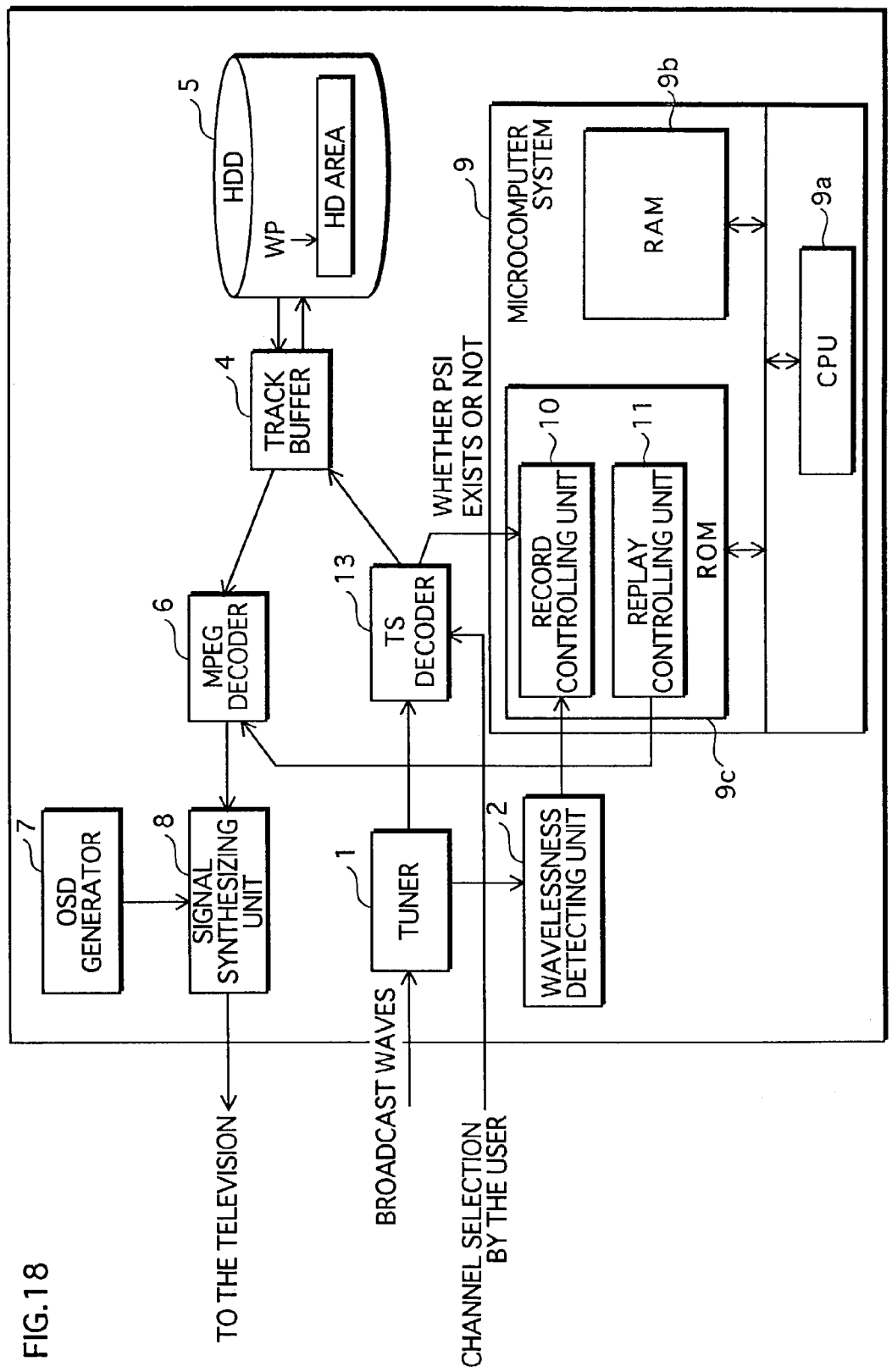
FIG. 18 is a diagram to show the internal structure of the recording apparatus of the fifth embodiment.

FIG. 18 is a diagram to show the internal structure of the recording apparatus of the fifth embodiment. The difference between FIG. 18 and FIG. 3 is that the MPEG encoder 3 is replaced with a TS decoder 13 in FIG. 18.

The TS decoder 13 receives a channel selection from the user, and judges whether a particular piece of PSI corresponding to this selected channel is included in the transport streams or not, and informs the recording apparatus of the judgment result. When the corresponding piece of PSI is included, the TS decoder 13 separates a video stream and an audio stream constituting the broadcast program from the transport stream on the basis of the piece of PSI. In the multi-program-type transport streams, since each broadcast program is identified with an "event-id", as long as there is a piece of PSI to which an "event-id" of the broadcast program selected by the user is attached, the separation process of video stream and audio stream continues.

The following describes the process by the record controlling unit 10 of the fifth embodiment.

The record controlling unit 10 judges that a service period is remaining as long as it receives from the TS decoder 13 notification that PSI is included. When receiving from the TS decoder 13 notification that PSI is not included, the record controlling unit 10 treats it as a switch to an out-of-service period in that channel and detects a point of time at which the switch has occurred. When receiving notification that PSI is included in that channel again, the record controlling unit 10 treats it as a switch from an out-of-service period to a service period in that channel, and detects a point of time at which the switch has occurred.

When there is PSI to which an "event-id" is attached, but scripts of the PSI (PMTs and PATs) are invalid, the record controlling unit 10 may judge that it is an out-of-service period. When scripts of the PSI (PMTs and PSTs) are valid, but the identified stream is an announce message, the record controlling unit 10 may judge that it is an out-of-service period. An announce message here denotes a message saying that the channel selected by the user is in an out-of-service period, or that there is no broadcast service provided on the selected channel.

As so far explained, according to the fifth embodiment, it is possible to detect points of time at which a service period is switched to an out-of-service period, and an out-of-service period is switched to a service period, even with the digital broadcast system in which multi-program-type transport streams are transmitted. Thus, it is possible to widen the range of utilization of the recording apparatus.

In the fifth embodiment as well, it is acceptable if the recording apparatus comprises the MPEG encoder 3 and the MPEG decoder 6. This way, it is possible to detect out-of-service periods during which color bars or a view from the broadcast station are displayed, by having the MPEG decoder 6 perform decoding of the digital data and having the MPEG encoder 3 perform re-encoding.

In addition, when the digital broadcast waves that include transport streams are suspended, it is detected as an out-of-service period in the same fashion as in the first embodiment.

Supplemental Information for the First to Fifth Embodiments

The embodiments so far explained are mere examples of systems which are expected to be able to yield the most effective results in the current situation. The present invention may be modified within the scope of the gist of the invention. The following (A), (B), (C) and so on are some representative examples of modification:

(A) The recording apparatus in the first through fifth embodiments is a kind that is connected to the TV 101; however, it is also acceptable that the recording apparatus is incorporated into a liquid crystal display. Also, the recording apparatus in the first embodiment comprises the HD drive 5 and the MPEG encoder 3; however, it is acceptable that the recording apparatus is connected to them via IEEE1394 connector instead of comprising them. In addition, of the recording apparatus in all the embodiments, only the microcomputer system 9 which takes the main role in the recording process may be construed as the recording apparatus.

Since any of these recording apparatus is based on the invention described in the specification of the present application, no matter what mode is used, an action of manufacturing a recording apparatus on the basis of the internal structure of the recording apparatus described in the fast through fifth embodiments is taken as an embodiment of the invention described in the specification of the present application. Actions of transfer, whether onerous (i.e., sales) or gratuitous (i.e., bestowal), lease, and import of the recording apparatus in the first through fifth embodiments are also construed as an embodiment of the present invention. Actions of offering such a transfer and a lease to public users through storefront displays and distribution of catalogues and brochures are also construed as an embodiment of the present invention.

(B) Information processing by the program shown in FIG. 6 is materially achieved with use of hardware resources such as CPU, MPEG encoder, and HD drive. It means that the recording apparatus of the first through fifth embodiments can be structured through information processing performed by achieving means in which the program and the hardware resources collaborate, according to each purpose of usage.

Since the information processing by the program is materially achieved with use of the hardware resources, the program whose procedure is shown in the flowchart of FIG. 6 is construed as a creation of technical idea utilizing natural laws, and therefore the program by itself qualifies as an invention. In other words, the procedure shown in FIG. 6 discloses a mode of embodiment of the program of the present invention.

Additionally, in the first through fifth embodiments, the program of the present invention is embodied as being incorporated in the recording apparatus; however, it is also acceptable to be embodied as being separated from the recording apparatus.

Embodiments of the program itself include (1) production of the program, (2) transfer of the program, whether onerous or gratuitous, (3) lease of the program, (4) import of the program, (5) providing the program for the public via bi-directional electronic communication lines, and (6) offering such a transfer and a lease to public users through storefront displays and distribution of catalogues and brochures.

"(5) Providing the program for the public via bi-directional electronic communication lines" includes actions of transmitting the program for use by a user (program download service), and providing a user with functional features of the program via electronic communication lines while the program itself remains with who provides it (ASP service with function provision).

(C) The "time" element of each of the steps chronologically executed in the flowchart of FIG. 6 is considered as one of the essentials to specify the invention. Thus, the procedure in the flowchart discloses a mode of using the recording method, and the flowchart itself is an embodiment of utilization of the recording method of the present invention. Needless to say, an action of executing the procedures described in the flowchart by chronologically executing the steps so as to achieve the object and obtain the operation and effects of the present invention is an embodiment of the recording method of the present invention.

(D) In the first through fifth embodiments, the recording medium on which video contents are to be recorded has been explained as an HD; however, the physical characteristics of HDs do not contribute so much to the operation and effects of the present invention; it is therefore acceptable to use other recording media as long as they have capacities to record broadcast programs, e.g. optical discs such as DVD-RAMs, DVD-RWs, DVD+RWs, CD-RWs, and Blu-ray Discs. Magneto-optical discs such as PDs and MOs are also acceptable. Besides, semiconductor memory cards are also acceptable, e.g. SD Memory Cards, Compact Flash Cards, Smart Media, Memory Sticks, MultiMedia Cards, and PCM-CIA Cards. Other acceptable examples include magnetic discs such as Flexible Discs, SuperDisks, Zip, and Clik! as well as removable hard disk drives such as ORB, Jaz, SparQ, Syjet, EzFlyer, and Microdrive.

(E) In the first to fifth embodiments, a video stream and an audio stream are multiplexed on a VOBU; however, it is also acceptable if multiplexed are sub-image streams in which subtitle texts are compressed with run-length encoding as well as other types of control information.

(F) For convenience sake, the continuous recording process has been explained as being performed using all of the HD area; however, it is acceptable to be performed using one of HD partitions.

(G) In the description of the embodiments, overwriting has been performed in units of one VOBU; however, that is merely one of the modes to embody the recording apparatus of the present invention according to the DVD-Video Recording Standard. It is also acceptable to perform overwriting in units of a plurality of VOBUs or in any other data units that are similar to VOBUs based on other recording standards.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus that receives broadcast waves, generates pieces of digital data from the broadcast waves, and writes the generated pieces of digital data onto a recording medium, the recording apparatus comprising:
   a recording unit operable to perform a continuous recording process using the recording medium as a ring buffer by writing a piece of digital data onto the ring buffer in the recording medium every time a new piece of digital data is generated;
   a determining unit operable to determine a first point of time at which a service period is switched to an out-of-service period, and a second point of time at which an out-of-service period is switched to a service period, the switches being made by a broadcast station; and
   a controlling unit operable to (i) have the recording unit suspend the continuous recording process at the first point of time, and (ii) have the recording unit resume the continuous recording process at the second point of time.

2. The recording apparatus of claim 1, further comprising:
   a tuner operable to receive the broadcast waves and output broadcast signals that have been modulated into the broadcast waves; and
   an encoder operable to encode the broadcast signals outputted by the tuner to generate the pieces of digital data, wherein
   the encoder calculates a bit rate to be assigned to the broadcast signals at a time of the encoding, and
   the out-of-service period is a period during which at least either (a) the broadcast waves are suspended, or (b) the broadcast waves are not suspended, but the bit rate calculated by the encoder is lower than a predetermined threshold value.

3. The recording apparatus of claim 2, wherein
   the recording unit is a driving apparatus for the recording medium, and
   when the broadcast waves are suspended, the controlling unit suspends the continuous recording process by suspending an electric power supply both to the encoder and the driving apparatus, whereas
   when the broadcast waves are not suspended, but the bit rate calculated by the encoder is lower than the predetermined threshold value, the controlling unit suspends the continuous recording process by suspending an electric power supply to the driving apparatus.

4. The recording apparatus of claim 2, wherein
   the bit rate is lower than the predetermined threshold value when the broadcast signals represent a still image.

5. The recording apparatus of claim 2, further comprising a receiving unit operable to receive from a user a setting regarding a level of motionlessness of images to be displayed during the out-of-service period, wherein
   the threshold value varies according to the level of motionlessness received by the receiving unit.

6. The recording apparatus of claim 1, further comprising a pointer that indicates a location of writing within an area in the recording medium, wherein
   the piece of digital data is to be written to a part of the area located after the pointer, and
   when the piece of digital data is written onto the ring buffer, the recording unit (i) adds to the pointer a size of the piece of digital data, when each piece of digital data has been written, and (ii) moves the pointer to a start of the area in the recording medium, when the pointer has reached an end of the area in the recording medium.

7. The recording apparatus of claim 1, wherein
   the broadcast waves are modulated transport streams, and
   the recording unit includes a decoder operable to receive a channel selection by a user and obtain from the transport streams a piece of program-specific information corresponding to the selected channel,
   each of the pieces of digital data to be written is identified by the obtained piece of program-specific information from among pieces of digital data included in the transport steams, and
   the out-of--service period is a period during which at least either (a) the piece of program-specific information corresponding to the selected channel is not included in the transport streams, (b) the piece of program-specific information corresponding to the selected channel is invalid, or (c) the broadcast waves are suspended.

8. A computer-readable recording medium on which a computer-readable program is recorded, the computer-readable program instructing a computer to receive broadcast waves, generate pieces of digital data from the broadcast waves, and write the generated pieces of digital data onto a recording medium by having the computer execute:

a recording step of performing a continuous recording process using the recording medium as a ring buffer by writing a piece of digital data onto the ring buffer in the recording medium every time a new piece of digital data is generated;

a determining step of determining a first point of time at which a service period is switched to an out-of-service period, and a second point of time at which an out-of service period is switched to a service period, the switches being made by a broadcast station; and a controlling step of (i) having the recording step suspend the continuous recording process at the first point of time, and (ii) having the recording step resume the continuous recording process at the second point of time.

9. The computer-readable recording medium of claim 8, wherein the computer includes:

a tuner operable to receive the broadcast waves and output broadcast signals that have been modulated into the broadcast waves; and an encoder operable to encode the broadcast signals outputted by the tuner to generate the pieces of digital data, the encoder calculates a bit rate to be assigned to the broadcast signals at a time of the encoding, and the out-of-service period is a period during which at least either (a) the broadcast waves are suspended, or (b) the broadcast waves are not suspended, but the bit rate calculated by the encoder is lower than a predetermined threshold value.

10. The computer-readable recording medium of claim 9, wherein the recording step is performed by a driving apparatus for the recording medium, and when the broadcast waves are suspended, the controlling step suspends the continuous recording process by suspending an electric power supply both to the encoder and the driving apparatus, whereas when the broadcast waves are not suspended, but the bit rate calculated by the encoder is lower than the predetermined threshold value, the controlling step suspends the continuous recording process by suspending an electric power supply to the driving apparatus.

11. The computer-readable recording medium of claim 9, wherein the bit rate is lower than the predetermined threshold value when the broadcast signals represent a still image.

12. The computer-readable recording medium of claim 9, comprising wherein the computer-readable program further instructs the computer to execute:

a receiving step of receiving from a user a setting regarding a level of motionlessness of images to be displayed during the out-of-service period, wherein the threshold value varies according to the level of motionlessness received by the receiving step.

13. The computer-readable recording medium of claim 8, wherein a pointer indicates a location of writing within an area in the recording medium, the piece of digital data is to be written to a part of the area located after the pointer, and when the piece of digital data is written onto the ring buffer, the recording step (i) adds to the pointer a size of the piece of digital data, when each piece of digital data has been written, and (ii) moves the pointer to a start of the area in the recording medium, when the pointer has reached an end of the area in the recording medium.

14. The computer-readable recording medium of claim 8, wherein the broadcast waves are modulated transport streams, and the computer includes a decoder operable to receive a channel selection by a user and obtain from the transport streams a piece of program-specific information corresponding to the selected channel, each of the pieces of digital data to be written is identified by the obtained piece of program-specific information from among pieces of digital data included in the transport streams, and the out-of-service period is a period during which at least either (a) the piece of program-specific information corresponding to the selected channel is not included in the transport streams, (b) the piece of program-specific information corresponding to the selected channel is invalid, or (c) the broadcast waves are suspended.

* * * * *